United States Patent [19]

Ohata et al.

[11] Patent Number: 5,585,424

[45] Date of Patent: Dec. 17, 1996

[54] ACRYLIC RUBBER-BASED COMPOSITION

[75] Inventors: Hiroyuki Ohata; Harukazu Okuda, both of Fukui-ken, Japan

[73] Assignee: Nissin Chemical Industry Co., Ltd., Fukui-ken, Japan

[21] Appl. No.: 362,949

[22] Filed: Dec. 23, 1994

[30] Foreign Application Priority Data

Dec. 27, 1993 [JP] Japan .................................. 5-333138

[51] Int. Cl.$^6$ .................................................. C08F 30/08
[52] U.S. Cl. ...................... 524/264; 523/212; 525/326.5; 526/279
[58] Field of Search ............................ 526/279; 523/212; 524/264; 525/326.5

[56] References Cited

U.S. PATENT DOCUMENTS 4,761,452  8/1988  Itoh et al. ................................ 524/521

FOREIGN PATENT DOCUMENTS 01279952  11/1989  Japan .

OTHER PUBLICATIONS

Derwent Publications Ltd., London, GB; AN 89–374158 "Rubber Composition for Wear Resistant Vulcanized Products".

European Search Report dated Apr. 13, 1995.

Primary Examiner—Edward J. Cain
Attorney, Agent, or Firm—Millen, White, Zelano, & Branigan, P.C.

[57] ABSTRACT

Proposed is an acrylic rubber-based composition suitable for hot-air vulcanization under normal pressure in a continuous process. The rubber composition comprises, besides an acrylic rubber polymer having, in a molecule, at least two silicon-bonded vinyl groups to serve as the crosslinking sites, reinforcing filler and organic peroxide as a vulcanizing agent, an alkoxy silane compound having a vinyl group or (meth)acryloxy group bonded to the silicon atom, such as vinyl triethoxy silane and 3-methacryloxypropyl trimethoxy silane in a specified amount. This unique ingredient serves as a vulcanization accelerator so that the vulcanization reaction is so rapid as to be freed from foaming of the vulcanizate due to the volatile matters and is complete even in the surface layer without the vulcanization-inhibiting influences by the atmospheric oxygen.

10 Claims, No Drawings

ACRYLIC RUBBER-BASED COMPOSITION

BACKGROUND OF THE INVENTION

The present invention relates to an acrylic rubber-based composition or, more particularly, to an acrylic rubber-based composition suitable for hot-air vulcanization under normal pressure in a continuous molding and vulcanizing process with a greatly improved productivity as compared with conventional acrylic rubber-based compositions which can be molded and vulcanized only under compression in a batch-wise process.

As is well known, acrylic rubbers are widely used as a principal material of rubber parts in automobiles since these rubbers have outstandingly excellent high heat resistance and oil resistance among various synthetic rubbers. It is known that the velocity of vulcanization of acrylic rubbers in vulcanization largely depends on the types of the functional groups in the rubber molecules to pertain to the vulcanization reaction. For example, the vulcanizing velocity of an acrylic rubber having active halogen atoms as the vulcanization sites is large as compared with acrylic rubbers functional with epoxy groups. While the vulcanizing velocity of an acrylic rubber should desirably be as high as possible since a rubber composition contains some vaporizable ingredients and the vulcanization reaction usually produces a volatile matter as a decomposition product which unavoidably causes foaming or surface blistering of the shaped and vulcanized rubber article unless the vulcanization is undertaken under compression, the vulcanizing velocity of the active halogen-functional acrylic rubber composition is still not adequately high. Therefore, such an acrylic rubber composition is not suitable for the so-called hot-air vulcanization under normal pressure in order to obtain shaped and vulcanized rubber articles free from foaming and blistering, which can be obtained only by the vulcanization under compression.

Japanese Patent Publications No. 2-1859 and No. 4-30963 propose a rapid vulcanization-type acrylic rubber composition by introducing organosilicon groups having a silicon-bonded vinyl group into the acrylic rubber molecules. A substantial improvement can be obtained by this means relating to the vulcanizing velocity but the improvement obtained thereby is far from satisfactory because microscopic bubbles are always found in the vulcanizate obtained by the hot-air vulcanization under normal pressure. Moreover, the acrylic rubber composition of this type has another problem that the vulcanization reaction thereof is subject to inhibition by the atmospheric oxygen so that the vulcanization in the surface layer is more or less incomplete to cause falling of the surface layer when scratched with a finger nail. This problem of vulcanization inhibition by the atmospheric oxygen can of course be avoided and full vulcanization can be obtained even in the surface layer of the rubber article by conducting the vulcanization under an atmosphere of high temperature nitrogen gas. However, but this measure is not practicable because leakage of nitrogen gas is more or less unavoidable from the vulcanization ovens working under nitrogen atmosphere possibly causing a workers safety problem due to oxygen deficiency in the working environment which can be solved only with great expenses for the construction and maintenance of the facilities.

SUMMARY OF THE INVENTION

The present invention accordingly has an object to provide a novel and improved acrylic rubber-based composition which can be shaped and vulcanized into fully vulcanized rubber articles even by the hot-air vulcanization under normal pressure in a continuous process with a greatly improved productivity as compared with vulcanization under compression in a batch-wise process which is the only practicable way for the vulcanization of conventional acrylic rubber-based compositions.

Thus, the acrylic rubber-based composition of the invention comprises, as a uniform blend:

(A) 100 parts by weight of an acrylic rubber polymer having, in a molecule, an ethylenically unsaturated group;

(B) from 0.1 to 20 parts by weight of an alkoxy silane compound having, in a molecule, an ethylenically unsaturated group;

(C) from 10 to 200 parts by weight of a reinforcing filler; and (D) from 0.1 to 10 parts by weight of an organic peroxide.

In particular, the acrylic rubber polymer as the component (A) has organosilicon groups pendant to the polymer molecules clues. More particularly, the ethylenically unsaturated group therein is provided, preferably, as a vinyl group directly bonded to the silicon atom of an organosilicon group.

DETAILED DESCRIPTION OF THE PREFERRED EMBODIMENTS

As is described above, the acrylic rubber-based composition of the invention comprises, as the essential ingredients, four components (A) to (D), of which the most characteristic is the unsaturation-containing alkoxy silane compound as the component (B) which exhibits a synergistic effect when combined with the other components so as to solve the above described problems in the conventional acrylic rubber-based compositions encountered in the hot-air vulcanization under normal pressure.

The component (A) in the inventive composition is an acrylic rubber polymer having, in a molecule, at least one ethylenically unsaturated group which is preferably a vinyl group bonded to the silicon atom in an organosilicon group pendant to the rubber polymer molecules. Such an acrylic rubber polymer can be obtained by the radical copolymerization of a monomer mixture comprising: (a) a first comonomer which is an alkyl or alkoxy-substituted alkyl ester of (meth)acrylic acid represented by the general formula $CH_2=CR^1—CO—OR^2$, in which $R^1$ is a hydrogen atom or a methyl group and $R^2$ is an alkyl group or an alkoxy-substituted alkyl group having carbon atoms not exceeding 18 in number, (b) a second comohomer having, in a molecule, two types of ethylenically unsaturated groups, of which one pertains to the radical copolymerization with the above mentioned first comohomer and the other is unreactive and remains intact in the radical copolymerization with the above mentioned first comohomer but pertains to the crosslinking reaction in the composition containing an organic peroxide as the component (D) as the vulcanizing agent, such a monomeric compound being exemplified by those containing, in a molecule, at least one organosilicon group having a vinyl group directly bonded to the silicon atom besides another ethylenically unsaturated group capable of pertaining to the copolymerization with the (meth)acrylic comohomer (a), ethylidene norbornene, esters of (meth)acrylic acid containing a dicyclopentenyl group and the like and, optionally, (c) one or more of other ethylenically unsaturated monomeric compounds copolymerizable with the comonomers (a) and (b).

Examples of the above mentioned ester of (meth)acrylic acid as the first comonomer (a) in the monomer mixture include methyl (meth)acrylate, ethyl (meth)acrylate, butyl (meth)acrylate, 2-ethylhexyl (meth)acrylate, 2-methoxyethyl (meth)acrylate, 2-ethoxyethyl (meth)acrylate and the like though not being particularly limited thereto.

The second monomer (b) in the monomer mixture for the preparation of the component (A) should have two ethylenically unsaturated groups of different types, of which one pertains to the copolymerization reaction with the comohomer (a) mentioned above while the other of the unsaturated groups does not pertain to the copolymerization reaction but acts as a crosslinking site in the vulcanization of the rubber composition in the presence of an organic peroxide. A preferable class of such an unsaturated monomeric compound includes organosilicon compounds, in which at least one of the silicon atoms has a vinyl group directly bonded thereto, substituted by a (meth)acryloxy group or a vinyl-substituted phenyl group which pertains to the copolymerization reaction with the comohomer (a) while the vinyl group bonded directly to a silicon atom does not pertain to the copolymerization reaction but acts as the crosslinking site to impart the rubber composition with a high crosslinking velocity.

Examples of such an organosilicon compound include: acryloxymethyl vinyl dimethyl silane; 1-(3-methacryloxypropyl)-3-vinyl-1,1,3,3-tetramethyl disiloxane; 4-vinylphenyl vinyl dimethyl silane; 3-acrylamidopropyl vinyl dimethyl silane; 1-(3-methacryloxypropyl)-3,5,7-trivinyl-1,3,5,7-tetramethyl cyclotetrasiloxane; 1-(3-methacryloxypropyl)-3,5-divinyl-1,3,5-trimethyl cyclotrisiloxane and the like though not being particularly limited thereto.

Alternatively to the above described organosilicon compounds, the comohomer (b) to be copolymerized with the comohomer (a) can be ethylidene norbornene of which the ethylidene group pertains to the copolymerization reaction leaving the norbornene unsaturation intact to act as the crosslinking site in the subsequent vulcanization. Further alternatively, the comonomer (b) can be a dicyclopentenyl-substituted (meth)acrylate compound of which the (meth)acrylic unsaturation pertains to the copolymerization reaction leaving the dicyclopentenyl unsaturation intact to serve as the crosslinking site in the subsequent vulcanization.

The copolymerization ratio of the comonomers (a) and (b) should be such that the amount of the comohomer (b) in the monomer mixture for the preparation of the acrylic rubber polymer as the component (A) is in the range from 0.01 to 10% by weight or, preferably, from 0.3 to 5% by weight based on the amount of the comohomer (a) in order that the acrylic rubber polymer obtained by the copolymerization may have at least two ethylenically unsaturated groups capable of acting as the crosslinking sites in a molecule. When the amount of the comonomer (b) is too small relative to the comonomer (a), the acrylic rubber polymer suffers from a decrease in the velocity of vulcanization due to the unduly small number of the crosslinking sites while, when the amount of the comohomer (b) is too large, the vulcanizate obtained by the vulcanization of the acrylic rubber composition has brittleness due to the unduly large crosslinking density.

Examples of the optional comohomer (c) in the monomer mixture for the preparation of the component (A) include styrene, vinyl toluene, α-methyl styrene, vinyl naphthalene, acrylonitrile, methacrylonitrile, acrylamide, vinyl acetate, vinyl chloride, ethylene, propylene and the like. When these optional comonomers (c) are used in combination with the comonomers (a) and (b), the amount of the comohomer (c) in the monomer mixture should not exceed 20% by weight based on the amount of the comonomer (a). When the amount of the comohomer (c) is too large, disadvantageous influences are caused on the properties inherent in the acrylic rubber polymer obtained by the copolymerization of the monomer mixture.

The acrylic rubber polymer as the component (A) in the inventive rubber composition can be obtained by subjecting the above described monomer mixture to a free-radical polymerization reaction in the presence of a radical polymerization initiator according to a known procedure. An alternative method, however, is applicable to the preparation of the acrylic rubber polymer as the component (A), in which the comohomer (a) and an ethylenically unsaturated monomer having, in a molecule, a carboxyl group, such as acrylic acid, methacrylic acid, maleic acid, fumaric acid, itaconic acid and the like, are first copolymerized either alone or in combination with the optional comohomer (c) to obtain a carboxyl-containing copolymer which is then reacted with an organosilicon compound having a vinyl group directly bonded to the silicon atoms and a functional group capable of reacting with the carboxyl groups in the polymer, such as epoxy groups, so as to introduce the vinyl-containing organosilicon group into the acrylic rubber polymer.

The component (B) in the inventive acrylic rubber composition is an unsaturation-containing alkoxy silane compound of which the ethylenically unsaturated group is preferably a vinyl group, acryloxy group or methacryloxy group. Examples of such an unsaturation-containing alkoxy silane compound include: vinyl trimethoxy silane; vinyl triethoxy silane; n-hexen-5-yl trimethoxy silane; 3-vinyloxypropyl trimethoxy silane; 4-vinylphenyl trimethoxy silane; 3-methacryloxypropyl trimethoxy silane; 3-methacryloxypropyl triethoxy silane; 3-methacryloxypropyl methyl dimethoxy silane; 3-acryloxypropyl trimethoxy silane; 3-acryloxypropyl methyl dimethoxy silane; 3-(2-methacryloxyethyloxy)propyl trimethoxy silane and the like though not being particularly limited thereto.

The amount of the unsaturation-containing alkoxy silane compound as the component (B) in the inventive acrylic rubber composition is in the range from 0.1 to 20 parts by weight or, preferably, from 2 to 10 parts by weight per 100 parts by weight of the acrylic rubber polymer as the component (A). When the amount of the component (B) is too small, the desired effect for the acceleration of vulcanization of the composition cannot be fully obtained to causing difficulties in the hot-air vulcanization of the composition under normal pressure. When the amount of the component (B) is too large, on the other hand, the vulcanizate obtained from the rubber composition is imparted with some brittleness due to the excessively large crosslinking density and is not suitable for practical uses.

Unexpectedly and surprisingly, the unsaturation-containing alkoxy silane compound as the component (B) in the inventive acrylic rubber composition serves as a vulcanization accelerator in the vulcanization reaction of the acrylic rubber polymer as the component (A) in the presence of an organic peroxide enabling the hot-air vulcanization of the rubber composition under normal pressure. Although the exact mechanism leading to this unexpectedly advantageous behavior of the component (B) is not well understood, it is presumable that the alkoxysilyl group of the unsaturation-containing alkoxy silane compound is bonded to the surface of the reinforcing filler particles as the component (C) by the coupling reaction with the functional groups on the filler particles such as silanol, carboxyl, phenol and quinone groups while the unsaturated groups in the component (B) pertain to the crosslinking reaction of the acrylic rubber polymer molecules through the unsaturated groups so as to serve as a linking unit between the molecules of the acrylic rubber polymer and the particles of the reinforcing filler. Namely, it would be a fair assumption that the vulcanization velocity of the acrylic rubber composition is greatly enhanced by the admixture of the composition with the unsaturation-containing alkoxy silane compound as the component (B) because of the concurrent proceeding of the above mentioned crosslinking reaction through the filler particles in addition to the ordinary crosslinking reaction between the molecules of the unsaturation-containing acrylic rubber polymer to such an extent as to overcome the vulcanization inhibition in the surface layer by the atmospheric oxygen and to enable the hot-air vulcanization of the rubber composition under normal pressure without foaming because the vulcanization reaction proceeds preceding vaporization of the volatilizable constituents in the rubber composition.

The component (C) in the inventive acrylic rubber composition is a reinforcing filler which is exemplified by carbon blacks and finely divided silica fillers including fumed silica fillers prepared in a dry process by the flame hydrolysis of a vaporizable silicon compound and precipitated silica fillers prepared in a wet process from an alkyl silicate or sodium silicate. It is preferable to use a reinforcing filler having a specific surface area of at least 30 $m^2/g$. Various grades of commercial reinforcing fillers are available on the market and can be used as such.

The amount of the reinforcing filler as the component (C) in the inventive acrylic rubber composition is in the range from 10 to 200 parts by weight per 100 parts by weight of the acrylic rubber polymer as the component (A). When the amount of the reinforcing filler is too small, the desired reinforcing effect is insufficient as a matter of course so that the mechanical properties of the vulcanizate cannot be practically high enough. When the amount of the reinforcing filler is too large, on the other hand, the vulcanizate of the composition is rigid with a decrease in the elasticity so as not to have excellent mechanical properties as a rubber article. Further, there are difficulties encountered in the compounding works of the reinforcing filler in such a large amount with the other ingredient and in the molding works of the composition, even if a uniform composition could ever be obtained.

The component (D) in the inventive acrylic rubber composition is an organic peroxide which serves as a vulcanizing agent. With an object to obtain a relatively high velocity of vulcanization, the organic peroxide is preferably selected from those decomposable at a relatively low temperature. For example, the organic peroxide should preferably have a half-life period of 1 minute at a temperature in the range from 100° to 160° C. Examples of the organic peroxide as the component (D) include bis(2,4-dichlorobenzoyl) peroxide, bis(2-chlorobenzoyl) peroxide, bis(4-chlorobenzoyl) peroxide, dibenzoyl peroxide, 1,1-di-tert-butylperoxy-3,5,5-trimethyl cyclohexane and the like.

The amount of the organic peroxide as the component (D) in the inventive acrylic rubber composition is in the range from 0.1 to 10 parts by weight per 100 parts by weight of the unsaturation-containing acrylic rubber polymer as the component (A). When the amount of the organic peroxide is too small, the vulcanization velocity of the rubber composition is unduly low so that the composition is not suitable for the hot-air vulcanization under normal pressure while, when the amount thereof is too large, the vulcanization velocity is excessively high sometimes to cause scorching of the rubber composition and, if a vulcanizate could be obtained, the mechanical properties thereof would be poor.

It is optional that the inventive acrylic rubber-based composition is further admixed, in combination with the organic peroxide mentioned above as the vulcanizing agent, with a conventional vulcanization accelerator such as triallyl isocyanurate, ethylene-glycol dimethacrylate, N,N'-1,3-phenylene bismaleimide and the like according to need.

It is further optional that the inventive acrylic rubber composition is admixed with various kinds of known additives conventionally used in rubber compositions according to need each in a limited amount. Examples of such optional additives include metal oxides such as titanium dioxide, zinc oxide and aluminum oxide, non-reinforcing fillers such as graphite powders, calcium carbonate, mica powders, talc, quartz powders, diatomaceous earth, aluminum hydroxide, calcium silicate and magnesium silicate, aging retarders, process oils, mold-release agents, coloring agents, ultraviolet absorbers, flame retardant agents, dispersion aids and so on.

The acrylic rubber composition of the present invention can be readily obtained by uniformly blending the above described essential ingredients, i.e. components (A) to (D), and optional ingredients each in specified amount by using a known rubber-processing machines such as Banbury mixers, kneaders, intermixers, two-roll mills and the like. The sequential order of blending of the various ingredients is not particularly limited. It is sometimes advantageous that a premix is prepared from the unsaturation-containing alkoxy silane compound as the component (B) and the reinforcing filler as the component (C) and the premix is blended with the other ingredients. While it is preferable to conduct the compounding work of the ingredients at an elevated temperature in order to ensure good intermixing thereof, the organic peroxide as the component (D) may be subject to thermal decomposition at an elevated temperature so that it is advisable that the compounding work is conducted at such an elevated temperature with the ingredients excepting the organic peroxide, which is added to the blend at the latest stage after decrease of the temperature to such a low temperature at which the organic peroxide is safe from thermal decomposition. In this regard, use of a rubber processing machine equipped with a cooling means is preferable in order to prevent scorching of the rubber composition, especially, when the organic peroxide is of a low temperature-decomposable type so that the compounding work with the organic peroxide can be performed at a controlled temperature not exceeding 70° C. When the reinforcing filler as the component (C) is a silica filler, it is usual that the silica filler contains moisture more or less so that the blend before the addition of the organic peroxide is heated at a temperature of 100° C. or higher to remove the moisture as completely as possible.

The inventive acrylic rubber composition obtained in the above described manner can be molded and vulcanized by the so-called hot-air vulcanization under normal pressure into a vulcanizate of a desired shape having excellent mechanical properties as a rubber article. The hot-air vulcanization of the rubber composition under normal pressure can be conducted in a continuous process by extruding the rubber composition through a die of a molding machine such an extruder and the extruded body in a continuous length is directly and continuously introduced into and passed through a tubular hot-air oven so that the molded rubber composition is vulcanized during running through the oven to be obtained as a vulcanizate at the exit of the oven. The process of hot-air vulcanization is particularly suitable for the preparation of a continuous-length vulcanizate such as hoses, tubes, sheets, strings and the like to exhibit a great industrial advantage.

In the following, the acrylic rubber-based composition of the invention is described in more detail by way of examples, in which the term of "parts" always refers to "parts by weight".

EXAMPLE 1

A blend was prepared by thoroughly mixing, in a pressurizable kneader:

100 parts of an acrylic rubber polymer having organosilicon groups each with a silicon-bonded vinyl group, referred to as the rubbery polymer A hereinafter, which was a copolymer of a monomer mixture consisting of 49.2% by weight of ethyl acrylate, 25.0% by weight of butyl acrylate, 25.0% by weight of 2-methoxyethyl acrylate and 0.8% by weight of 1-(3-methacryloxypropyl-3,5,7-trivinyl-1,3,5,7-tetramethyl cyclotetrasiloxane;

1 part of stearic acid;

2 parts of an aging retarder (Nauguard 445, a product by Uniroyal Co.);

50 parts of a precipitated silica filler (Nipsil LP, a product by Nippon Silica Industry Co.); and 4 parts of 3-methacryloxypropyl trimethoxy silane, followed by further continued kneading for 10 minutes at 130° C. to remove the moisture contained in the silica filler.

After cooling of the blend down to a temperature of 70° C. or below, the blend was admixed uniformly with:

3 parts of a silicone oil-based peroxide paste containing 50% by weight of 2,4-dichlorobenzoyl peroxide; and 2 parts of N,N'-1,3-phenylene bismaleimide, on a 8-inch roller mill under water-cooling so that the temperature of the rubber blend under kneading did not exceed 70° C. to give an acrylic rubber-based composition substantially free from occlusion of entrained air.

The thus obtained rubber composition was shaped into a 120 mm by 120 mm wide sheet of 2 mm thickness which was heated in an air oven at 200° C. for 5 minutes to effect vulcanization of the rubber sheet. The thus vulcanized rubber sheet had good appearance without bubbles inside or blistering on the surface. The condition of vulcanization was complete without failing of the surface layer when scratched with a finger nail. The rubber sheet was subjected to the measurement of the mechanical properties according to the procedure specified in JIS K 6301 to give the results shown in Table 1.

EXAMPLE 2

The experimental procedure was substantially the same as in Example i including the formulation of the acrylic rubber composition and the evaluation method thereof excepting for the replacement of 50 parts of the precipitated silica filler with a combination of 20 parts of the same silica filler and 20 parts of a titanium dioxide filler and replacement of the 3-methacryloxypropyl trimethoxy silane with the same amount of vinyl triethoxy silane.

The condition of vulcanization in the rubber sheet vulcanizate was as satisfactory as in Example 1. Table 1 also shows the mechanical properties of the rubber sheet vulcanizate.

EXAMPLE 3

The experimental procedure was substantially the same as in Example 1 including the formulation of the acrylic rubber composition and the evaluation method thereof excepting for the replacement of the rubber polymer A with a second acrylic rubber polymer, referred to as the rubber polymer B hereinafter, which was a copolymer of a monomer mixture consisting of 99% by weight of ethyl acrylate and 1% by weight of 1-(3-methacryloxypropyl)-3,5,7-trivinyl-1,3,5,7-tetramethyl cyclotetrasiloxane, and an increase of the amount of the 3-methacryloxypropyl trimethoxy silane to 6 parts.

The condition of vulcanization in the rubber sheet vulcanizate was as satisfactory as in Example 1. Table 1 also shows the mechanical properties of the rubber sheet vulcanizate.

EXAMPLE 4

The experimental procedure was substantially the same as in Example 1 including the formulation of the acrylic rubber composition and the evaluation method thereof excepting for the replacement of the precipitated silica filler with the same amount of an FEF carbon black, replacement of 4 parts of the 3-methacryloxypropyl trimethoxy silane with 6 parts of vinyl triethoxy silane and omission of the demoisturizing heat treatment of the blend at 130° C. for 10 minutes.

The condition of vulcanization in the rubber sheet vulcanizate was as satisfactory as in Example 1. Table 1 also shows the mechanical properties of the rubber sheet vulcanizate.

Further, the rubber composition kneaded on the roller mill was taken out in the form of a ribbon which was introduced into and continuously extruded in the form of a string out of a 5 mm diameter die opening of a 20 mm diameter extruder machine of L/D=15 running at 50 rpm with a barrel temperature of 40° C. and head temperature of 60° C. The string-formed rubber composition extruded out of the extruder was directly and continuously introduced into a 750 cm long tubular hot-air oven kept at 200° C. with a running velocity of 150 cm/minute so as to obtain a cured rubber string which was free from any internal voids and fully vulcanized even in the surface layer.

Comparative Example 1

The formulation of the acrylic rubber composition and the vulcanization procedure were substantially the same as in Example 4 excepting for the replacement of the rubber polymer A with a third acrylic rubber polymer, which was a copolymer of a monomer mixture consisting of 47.9% by weight of ethyl acrylate, 25.0% by weight of butyl acrylate, 25.0% by weight of 2-methoxyethyl acrylate and 2.1% by weight of vinyl monochloroacetate, replacement of the precipitated silica filler with the same amount of an FEF carbon black and replacement of 3-methacryloxypropyl trimethoxy silane with the same amount of vinyl triethoxy silane.

The condition of the vulcanizate was very poor due to great foaming and blistering and vulcanization in the surface layer was incomplete to cause failing when scratched with a finger nail. Mechanical properties of the vulcanizate sheet could not be determined.

Comparative Example 2

The formulation of the acrylic rubber composition and the vulcanization procedure were substantially the same as in Example 1 excepting for the omission of 3-methacryloxypropyl trimethoxy silane.

The conditions of the rubber sheet vulcanizate were that, although foaming was not so great, vulcanization was incomplete in the surface layer readily causing failing when scratched with a finger nail. Table 1 also shows the mechanical properties of the rubber sheet vulcanizate.

TABLE 1

|  | Hardness, JIS, scale A | Tensile strength, mPa | Ultimate elongation, % |
|---|---|---|---|
| Example 1 | 70 | 103 | 230 |
| Example 2 | 42 | 67 | 270 |
| Example 3 | 73 | 110 | 240 |
| Example 4 | 68 | 98 | 210 |
| Comparative Example 2 | 53 | 45 | 150 |

What is claimed is:

1. An acrylic rubber-based composition which consists essentially of, as a uniform blend:
   (A) 100 parts by weight of an acrylic rubber polymer which has an organosilicon group pendant to the polymer molecule and has, in a molecule, at least one ethylenically unsaturated group provided as a vinyl group directly bonded to a silicon atom of the organosilicon group;
   (B) from 0.1 to 20 parts by weight of an alkoxy silane compound having, in a molecule, an ethylenically unsaturated group;
   (C) from 10 to 200 parts by weight of a reinforcing filler; and
   (D) from 0.1 to 10 parts by weight of an organic peroxide.

2. The acrylic rubber-based composition as claimed in claim 1 in which the alkoxy silane compound as the component (B) is selected from the group consisting of: vinyl trimethoxy silane; vinyl triethoxy silane; n-hexen-5-yl trimethoxy silane; 3-vinyloxypropyl trimethoxy silane; 4-vinylphenyl trimethoxy silane; 3-methacryloxypropyl trimethoxy silane; 3-methacryloxypropyl triethoxy silane; 3-methacryloxypropyl methyl dimethoxy silane; 3-acryloxypropyl trimethoxy silane; 3-acryloxypropyl methyl dimethoxy silane; and 3-(2-methacryloxyethyloxy)propyl trimethoxy silane.

3. The acrylic rubber-based composition as claimed in claim 1 in which the amount of the alkoxy silane compound as the component (B) is in the range from 2 to 10 parts by weight per 100 parts by weight of the acrylic rubber polymer as the component (A).

4. The acrylic rubber-based composition as claimed in claim 1 in which the organic peroxide as the component (D) has a half-life period for thermal decomposition of 1 minutes at a temperature in the range from 100° to 160° C.

5. The acrylic rubber-based composition as claimed in claim 1 in which the reinforcing filler is a finely divided silica filler or a carbon black having a specific surface area of at least 30 m$^2$/g.

6. The acrylic rubber-based composition as claimed in claim 4 in which the organic peroxide as the component (D) is selected from the group consisting of bis(2,4-dichlorobenzoyl) peroxide, bis-(2-chlorobenzoyl) peroxide, bis(4-chlorobenzoyl) peroxide, dibenzoyl peroxide and 1,1-di-tert-butylperoxy-3,5,5-trimethyl cyclohexane.

7. The acrylic rubber-based composition of claim 1, wherein component (B) is an alkoxy silane having a vinyl group, acryloxy group or methacryloxy group as the ethylenically unsaturated group.

8. The acrylic rubber-based composition of claim 1, which is fully vulcanizable by hot-air vulcanization under normal pressure.

9. An acrylic rubber-based composition which consists essentially of, as a uniform blend:
   (A) 100 parts by weight of an acrylic rubber polymer having, in a molecule, at least one ethylenically unsaturated group;
   (B) from 0.1 to 20 parts by weight of an alkoxy silane compound having, in a molecule, an ethylenically unsaturated group;
   (C) from 10 to 200 parts by weight of a reinforcing filler; and
   (D) from 0.1 to 10 parts by weight of an organic peroxide,
   wherein the acrylic rubber polymer, (A), is obtained by radical copolymerization of a monomer mixture comprising:
   (a) a comonomer which is an alkyl or alkoxyl-substituted alkyl ester of (meth)acrylic acid of the formula $CH_2=CR^1-CO-OR^2$, where $R^1$ is a hydrogen atom or methyl group and $R^2$ is an alkyl group or an alkoxy-substituted alkyl group of 1–18 carbon atoms, and
   (b) a second comonomer being an organosilicon compound having a vinyl group directly bonded to the silicon atom and a further ethylenically unsaturated group, ethylidene norbornene or an ester of (meth)acrylic acid containing a dicyclopentenyl group.

10. The acrylic rubber-based composition of claim 9, wherein the second comonomer is ethylidene norbornene or an ester of (meth)acrylic acid containing a dicyclopentenyl group.

\* \* \* \* \*